United States Patent [19]
Mossbarger

[11] Patent Number: 4,711,198
[45] Date of Patent: Dec. 8, 1987

[54] THROW AWAY CAT LITTER BOX

[76] Inventor: George R. Mossbarger, 7000 Ebenezer Church Rd., Raleigh, N.C. 27612

[21] Appl. No.: 866,947

[22] Filed: May 27, 1986

[51] Int. Cl.$^4$ .............................................. A01K 1/00
[52] U.S. Cl. ..................................................... 119/1
[58] Field of Search ........................ 119/1, 19; 135/901, 135/904, 116; 52/79.5, 64; 220/403, 470

[56] References Cited

U.S. PATENT DOCUMENTS

| | | | |
|---|---|---|---|
| 1,879,473 | 9/1932 | Pitts | 119/19 X |
| 2,531,501 | 11/1950 | Cline | 135/904 X |
| 3,255,466 | 10/1966 | Weizer | 135/904 |
| 3,890,930 | 6/1975 | Clark | 119/1 |
| 4,096,827 | 6/1978 | Cotter | 119/1 |
| 4,348,982 | 9/1982 | Selby | 119/1 |
| 4,646,684 | 3/1987 | Embry | 119/1 |

FOREIGN PATENT DOCUMENTS 975364 11/1964 United Kingdom .................. 119/19

Primary Examiner—Carl D. Friedman
Assistant Examiner—Richard E. Chilcot, Jr.

[57] ABSTRACT

This invention is a cardboard box and interfitted cover that is upwardly pivotable, a plastic liner therewithin enclosing a quantity of litter, and means to tear open the liner to expose the litter to an animal.

11 Claims, 5 Drawing Figures

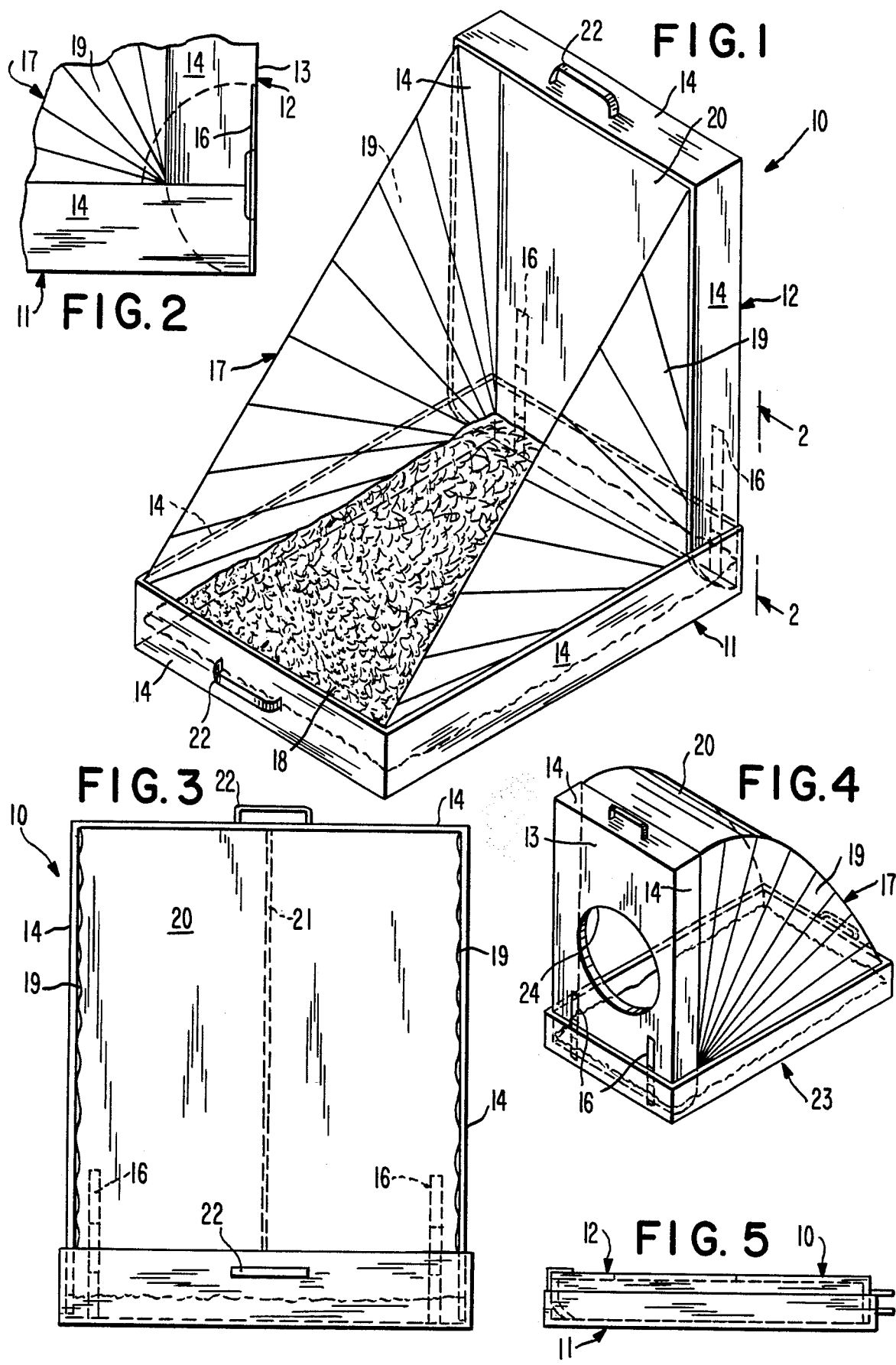

THROW AWAY CAT LITTER BOX

BACKGROUND OF THE INVENTION

1. Field of the Invention

This invention relates generally to household pet supplies. More specifically, it relates to litter boxes such as are used by cats or dogs for defecation purposes when kept housebound indoors.

2. Description of Prior Art

It is well known that conventional litter boxes for household pets comprise a pan and possibly also a removable cover made with an opening for the animal to enter; and a quantity of litter being kept in the pan which the pet owner must frequently replace so as to be fresh for the animal and not emanate an unpleasant odor within a home. Upon occassion the pan and cover must additionally be washed to be kept clean, as they are permanently kept, particularly if they become soiled by feces. All of this can be an unpleasant chore and is accordingly in need of an improvement.

SUMMARY OF THE INVENTION

Therefore, it is a principal object of the present invention, to provide a cat litter box that is disposable after prolonged use, thereby eliminating the chore of handling feces-laden litter and washing a soiled litter box.

Another object is to provide a throw away cat litter box which comes loaded with its own litter so to eliminate the chore of filling it with litter, and the box being made of inexpensive materials so that both are discarded together and easily replaced as needed.

Another object accordingly, is to provide a cat litter box which is more sanitary to handle, is more convenient, and saves time when making a change.

Other objects are to provide a throw away cat litter box which is simple in design, easy to use and efficient in operation.

These and other objects will be readily evident upon a study of the following specification and the accompanying drawing.

BRIEF DESCRIPTION OF THE DRAWINGS

FIG. 1 is a perspective view of the invention shown set up for operative use;

FIG. 2 is an enlarged, fragmentary side elevation view thereof as viewed on line 2—2 of FIG. 1;

FIG. 3 is a front elevational view of the invention;

FIG. 4 is a perspective view of a modified design of the invention; and

FIG. 5 is a side elevational view thereof shown in a collapsed position.

DETAILED DESCRIPTION

Referring now to the drawing in greater detail, and more particularly to FIGS. 1 to 3 and 5 thereof, at this time, the reference numeral 10 represents a throw away cat litter box, according to the present invention, wherein there is a box member 11 and a cover member 12, each of which is made of cardboard material and includes a rectangular flat panel 13 and a relatively low flange or side wall 14 around all edges of the box member and three side edges of the cover as shown. The cover member is made to fit snuggly inside the box member when the litter box is in a closed position. The cover member is pivotable outwardly from the box member at its fourth side edge 15 where a pair of leaf spring units 16 serve to retain the cover member in an opened up position, as shown in FIGS. 1 and 2.

In the present invention a thin polyethylene plastic liner 17 is adhered to an inner side of the litter box and comprises a waterproof bag inside which a quantity of litter 18 is sealed for laying inside the box member when in use. The bag includes opposite folding panels 19 and an upper panel 20 therebetween having a pull strip 21 for ripping open the bag so as to be pulled toward opposite sides and form an entry for the animal. Each side portion of the panel 20 thus forms flaps to aid protecting the litter being kicked out by the animal.

Handles 22 may be included on the device for ease in opening up the box and cover members. The device is in closed position as shown in FIG. 5 when stacked on a retail store shelf or when being disposed.

Reference is now made to FIG. 5 wherein a modified design of the invention embodiment comprises a generally similar throw out cat litter box 23, except instead of including a pull strip 21 on the liner panel 20, it is provided with a circular perforation on the cover member for tearing out an opening 24 to be used as the entry for the animal. Removal of the circular cut-out to make the opening 24 includes that the tear out perforations extend through both the cardboard and liner in order to provide access to the litter. A hanging loose curtain may be included to cover the opening 24 and keep odors from getting out.

For use, the throw away cat litter box is set up by simply pivoting the cover member upwardly and tearing an access opening for the animal. For disposal, the cover member is simply pivoted downwardly and the device, thus collapsed, is thrown away.

While various changes may be made in the detail construction, it is understood that such changes will be within the spirit and scope of the present invention as is defined by the appended claims.

What I now claim is:

1. A disposable cat litter container having prepackaged cat litter therein for receiving and collecting cat waste comprising: a cardboard box structure including upper and lower mating half sections wherein the upper half section includes a top panel with a surrounding side wall structure and wherein the lower half section includes a bottom panel with a surrounding side wall structure; means for pivotably mounting the upper and lower sections together to enable the upper half section to move between a generally horizontal closed position and a generally vertical upper position; an impervious flexible liner secured internally to the upper and lower half sections and including a bottom portion extending over the bottom panel and an upper portion secured to the upper half section; said flexible liner forming a pair of flexible and collapsible side walls that extend vertically between the upper and lower half sections when the upper half section assumes the open position, each flexible side wall assuming generally triangular shape and functioning to close opposite sides of the cardboard box structure when the same is in the open position; and cat litter overlying the bottom portion of the liner and disposed within the cardboard box structure.

2. The container of claim 1 including means for locking the upper half section the generally vertical open position.

3. The container of claim 1 wherein the side wall structure of the lower half section includes an upper edge and wherein the side wall structure of the upper half section includes opposite flexible panels which may be moved into engagment with the upper edge of the side wall structure of the lower half section to form a locking means.

4. The container of claim 1 wherein said impervious flexible material is plastic.

5. The container of claim 1 wherein said impervious flexible material is secured interiorly to the sidewalls of the upper and lower half sections.

6. The container of claim 1 further provided with a handle for carrying said container when closed.

7. The container of claim 1 further including a means for allowing an animal to enter the interior of said container through the panel of the upper half section.

8. The container of claim 7 wherein the flexible and collapsible side walls further extend to fully enclose the space between the half sections when the box is opened.

9. A disposable cat litter container having prepackaged cat litter therein for receiving and collecting cat waste comprising: a cardboard box structure including upper and lower mating half sections; means for pivotably mounting the upper and lower sections together enabling said upper half section to be upwardly pivoted to open said box; an impervious flexible liner secured internally to each half section; means for locking said box into the open position; and cat litter overlying the bottom portion of said liner and disposed within said cardboard box structure.

10. The container of claim 8 wherein said flexible impervious liner forms a pair of flexible and collaspsible side walls that extend vertically between the upper and lower half sections when said box assumes the open position.

11. The container of claim 8 further including a handle for carrying said container when closed.

* * * * *